March 26, 1968     G. B. FOSTER     3,374,644

ABSORPTION REFRIGERATION SYSTEM

Filed Jan. 3, 1967

INVENTOR.
GLENN B. FOSTER.
BY Frederick E. McMullen
ATTORNEY.

United States Patent Office 3,374,644
Patented Mar. 26, 1968

3,374,644
ABSORPTION REFRIGERATION SYSTEM
Glenn B. Foster, Liverpool, N.Y., assignor to Carrier
Corporation, Syracuse, N.Y., a corporation of Delaware
Filed Jan. 3, 1967, Ser. No. 606,983
14 Claims. (Cl. 62—141)

ABSTRACT OF THE DISCLOSURE

Concentration control for an absorption refrigeration system having means effective at a predetermined solution temperature to maintain the solution and refrigerant pumping means operative following shut down of the system to reduce solution concentration. The control includes means adapted to introduce refrigerant into the system solution circuit to reduce solution concentration when refrigerant in the evaporator exceeds a preset amount.

This invention relates to absorption refrigeration systems, and more particularly, to a solution concentration control for absorption refrigeration systems.

It is a principal object of the present invention to provide a new and improved solution concentration control for absorption refrigeration systems.

It is a further object of the present invention to provide an absorption refrigeration system incorporating an arrangement effective when the system is shut down to maintain the solution and refrigerant pumps operative until the solution concentration is reduced to a desirable level.

It is an object of the present invention to provide an absorption refrigeration system having means for injecting system refrigerant directly into the stream of relatively weak solution leaving the system absorber to control concentration of the system solution.

It is an object of the present invention to provide an absorption refrigeration system incorporating means to divert refrigerant leaving the system evaporator into the stream of solution leaving the absorber with means to regulate the flow of the diverted refrigerant in accordance with the amount of liquid refrigerant in the evaporator.

This invention relates to an absorption refrigeration machine comprising in combination: a generator section; a condenser section; an evaporator section; an absorber section; means forming a path for the flow of solution between the absorber and generator sections, the solution path forming means including first conduit means for conveying relatively weak solution from the absorber section to the generator section, solution pumping means, and second conduit means for returning relatively concentrated solution from the generator section to the absorber section; refrigerant pumping means; control means adapted to render the solution and refrigerant pumping means inoperative on shutdown of the machine; and means to control concentration of the solution, the solution concentration control means including means responsive to solution temperature conditions adapted at a predetermined solution temperature to override the first mentioned control means and maintain the solution and refrigerant pumping means operative following shut down of the machine.

Figure 1:
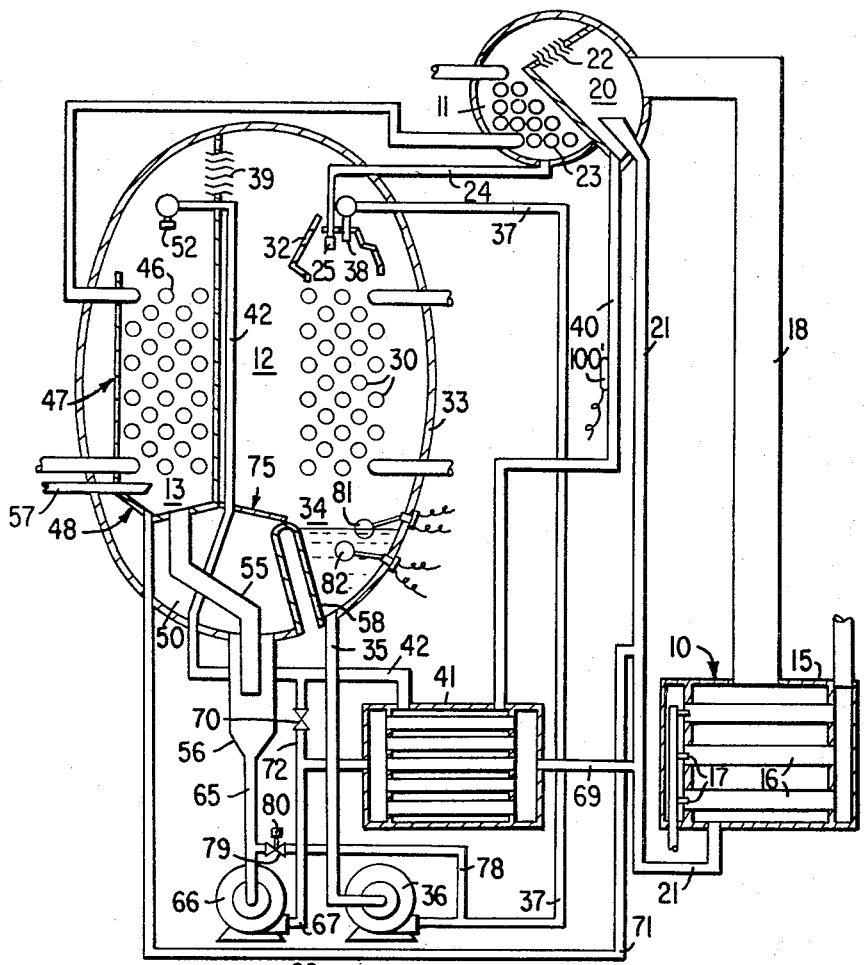
Figure 2:
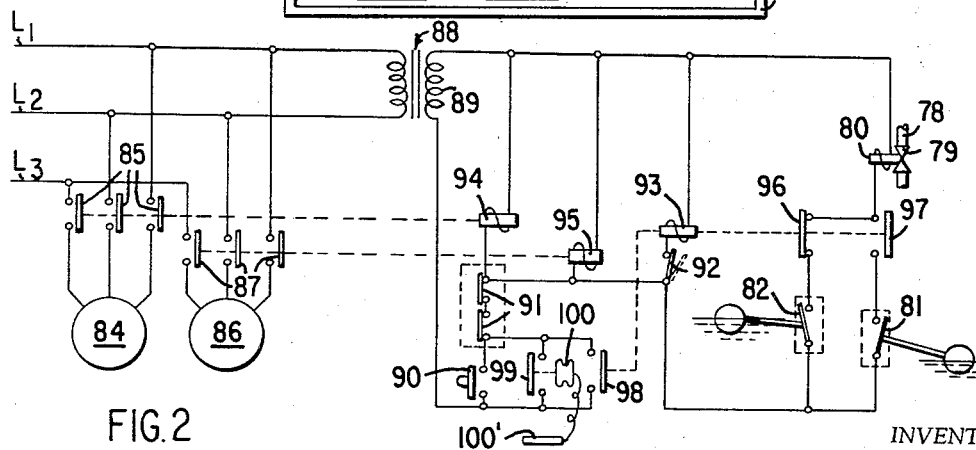

Other objects and advantages will be apparent from the ensuing description and drawings in which:

FIGURE 1 is a diagrammatic view of an absorption refrigeration system incorporating the concentration control of the present invention; and FIGURE 2 is a wiring diagram for the absorption refrigeration system of FIGURE 1.

The absorption refrigeration system of the present invention preferably employs water as a refrigerant, and a solution of lithium bromide as an absorbent. It is understood that other refrigerants and absorbents may be used. As used herein, the term "strong solution" refers to a concentrated solution of lithium bromide which is strong in absorbing power; the term "weak solution" refers to a dilute solution of lithium bromide which is weak in absorbing power.

Referring to FIGURE 1 of the drawing, there is shown an absorption refrigeration system including a generator section 10, a condenser section 11, an evaporator section 12, and an absorber section 13 interconnected to provide refrigeration. The evaporator and the absorber sections are preferably placed within cylindrical shell 33.

Generator section 10 includes a shell 15 having a plurality of fire tubes 16 therein to heat weak solution which is supplied to the generator. Gas jets 17 supply an ignited mixture of gas and air to tubes 16. A vapor lift tube 18 connects generator section 10 with separator 20.

Generating systems employing steam or hot water as the heat source may be contemplated in place of the direct fired generator section 10. In that construction, the generator is preferably jointly encased with condenser section 10 in a common shell.

Weak solution is heated in generator section 10 to boil off refrigerant vapor thereby concentrating the weak solution. A mixture of concentrated absorbent solution and refrigerant bubbles rises upwardly through vapor lift tube 18 into separator 20. Equalizer line 21, connecting the bottom of generator 10 with separator 20, serves as an overflow under some conditions and assists in stabilizing the generator boiling.

Condenser section 11 which may be encased in the same shell as separator 20, comprises a plurality of heat exchange tubes 23. A suitable cooling medium such as water is passed through condenser tubes 23. Refrigerant vapor, which separates from the mixture of absorbent solution in separator 20, passes into condenser section 11 through eliminators 22. There the refrigerant vapor is condensed to liquid by the cooling medium passing through tubes 23. Liquid refrigerant leaves condenser section 11 through condensate line 24. Spray nozzles 25 in evaporator section 12 distribute the refrigerant over evaporator tubes 30.

Heat exchange tubes 30 in evaporator section 12 are disposed in a tube bundle located in a region of shell 33. Water or other heat exchange fluid to be cooled is passed through tubes 30 in heat exchange relation with refrigerant supplied over the exterior surfaces of the tubes. Heat is aborbed from the water to be cooled by the refrigerant thereby cooling the water in tubes 30 and vaporizing refrigerant on the exterior surfaces of the tubes. The vaporized refrigerant passes from evaporator section 12 into absorber section 13 carrying with it the heat absorbed from the water passed through tubes 30. The chilled water may be circulated to a place of use as desired. Baffles 32 are provided to direct refrigerant vapor from the spray nozzles 25 toward the tube bundle in the evaporator section. Eliminators 39 may be provided in the vapor path between absorber section 13 and evaporator section 12.

Shell 33 forms a sump 34 under evaporator section tubes 30 to receive unevaporated liquid refrigerant which drips off the lower rows of tubes 30. A refrigerant recirculation line 35 receives refrigerant from sump 34, the refrigerant being pumped by pump 36 through line 37 to nozzles 38 where it is again discharged over the top of the tube bundle in the evaporator section.

Strong solution taken from the lower portion of separator chamber 20 flows through strong solution line 40 into heat exchanger 41 where it is placed in heat exchange relation with weak solution passing to the generator.

Strong solution leaves heat exchanger 41 through line 42 and is distributed by spray nozzles 52 over longitudinally extending tubes 46 to wet the absorber tubes. Cooling water or other suitable cooling medium is passed through tubes 46 to cool the absorbent solution sprayed on the exterior surfaces thereof.

A partition or baffle member 47 is disposed about the sides and bottom of the tube bundle in absorber section 13. The lower part 48 of baffle 47 forms a sump funneling weak solution from the absorber section into discharge conduit 55 and solution line 71. Discharge conduit 55 opens into outlet 56.

The liquid refrigerant in sump 34 and the weak solution in sump 50 are at different temperatures. To maintain physical as well as thermal separation therebetween, the base of shell 33 is provided with a longitudinally extending upstanding partition member 58. Baffle 75 is sealingly secured between member 58 and the lower portion of baffle member 47 to complete the separation of evaporator section 12 from absorber section 13.

A purge line 57 opens adjacent the lower portion of the tube bundle in absorber section 13. Line 57 communicates with a suitable purge mechanism (not shown).

Absorbent solution is withdrawn from absorber section 13 through weak solution line 65 and outlet 56. Weak solution is forwarded by pump 66 through line 67, heat exchanger 41 and line 69 to equalizer line 21 where it passes to generator section 10 for reconcentration. If desired, a portion of the weak solution discharged by pump 66 may be passed through weak solution recirculating line 72 to mix with concentrated absorbent solution in line 42 for discharge through spray nozzles 52. Valve 70 in line 72 regulates the flow of weak solution through recirculating line 72.

Solution line 71, provided between equalizer line 21 and collection sump 48, maintains the proper solution level in generator section 10 when the machine is placed in operation.

To control the concentration of the absorbent solution in the system and prevent overconcentration thereof, there is provided a bypass line 78 between refrigerant recirculation line 37 and weak solution line 65. Valve 79, which is preferably operated by a solenoid 80, controls opening and closing of line 78 as will be more apparent hereafter. Liquid level responsive switches 81, 82, which are preferably arranged to sense the level of liquid refrigerant in evaporator sump 34, control valve 79.

Referring to FIGURE 2 of the drawing, motor 84 of refrigerant pump 36 is connected through contacts 85 across leads $L_1$, $L_2$, $L_3$. Leads $L_1$, $L_2$, $L_3$ represent a suitable polyphase power source. It is understood that a single phase power source may be used if the circuit is suitably modified. Motor 86 of solution pump 66 is connected through contacts 87 across leads $L_1$, $L_2$, $L_3$.

The primary winding of step-down transformer 88 is connected across leads $L_1$, $L_2$. Start switch 90; one or more safety switches, designated by numeral 91; stop switch 92; and control relay 93 are series connected across the secondary winding 89 of transformer 88. Safety switches 91 may for example comprise system overtemperature protectors, suitable overload controls, etc. effective at a predetermined fault to interrupt the energizing circuit to control relay 93 and render the system inoperative.

The contactor coil 94 for refrigerant pump motor contacts 85 is series connected with safety switches 91 and start switch 90 across transformer winding 89. Similarly, the contactor coil 95 for solution pump motor contacts 87 is series connected with switches 91 and start switch 90 across transformer winding 89. Coils 94, 95 when energized close contacts 85, 87 representively to complete energizing circuits to pump motors 84, 86.

The solenoid operator 80 for bypass valve 79 is arranged in series with normally closed control relay switch 96, level responsive switch 82, safety switches 91, and start switch 90 across transformer winding 89. Normally open control relay switch 97 and level responsive switch 81 parallel switches 82, 96.

Control relay switch 98 is connected in parallel with start switch 90. Similarly, switch 99 of dilution control 100 parallels start switch 90. Dilution control 100, which may comprise any suitable temperature sensitive device, responds to temperature conditions of the strong solution. Preferably, sensor 100' of dilution control 100 is fastened to line 40.

On closure of start switch 90 a circuit is completed through safety switches 91 and the normally closed stop switch 92 to energize control relay 93. Closure of start switch 90 also completes energizing circuits through safety switches 91 to contactor coils 94, 95 which close contacts 85, 87 respectively to complete energizing circuits to the refrigerant and solution pump motors 84, 86 respectively. Control relay 93 closes relay switches 97, 98 and opens switch 96. Closure of switch 98 bypasses start switch 90. It is understood that closure of control switch 90 effectuates, by means of suitable control circuitry (not shown), start up of generator section 10.

When stop switch 92 is opened, generator section 10 is shut down. The energizing circuit to control relay 93 is interrupted. Deenergization of relay 93 opens switches 97, 98 and closes switch 96. Opening of switch 98 interrupts the energizing circuit to contactor coils 94, 95 to deenergize the refrigerant and solution pump motors 84, 86, unless control switch 99 is closed as will be more fully explained hereinafter.

It is understood that where one of the safety switches 91 opens signifying a predetermined system malfunction, the circuit to control relay 93 and contactor coils 94, 95 is interrupted thereby preventing further operation of the system.

During system operation, control relay 93 holds switch 96 open and switch 97 closed. Closure of switch 97 enables level responsive switch 81 to control, through solenoid 80 of valve 79, flow of refrigerant in bypass line 78 in response to changes in the refrigerant level in the evaporator sump 34. Control by level switch 82 at this time is precluded by switch 96.

Level switches 81, 82 are disposed in evaporator sump 34 and are responsive to the quantity of liquid refrigerant in sump 34. As can be understood, the amount of liquid refrigerant in evaporator sump 34 is proportional to the concentration of solution in the system. As the amount of refrigerant in sump 34 increases, the general concentration level of absorbent in the system increases. Where the liquid level in sump 34 rises above the preset response level of switch 81, switch 81 closes to complete, through control relay switch 98, safety switches 91, and control relay switch 97, an energizing circuit to solenoid 80. On energization, solenoid 80 opens valve 79 to divert a portion of the refrigerant discharged from pump 36 through bypass line 78 into solution line 65 and the inlet side of pump 66. The introduction of liquid refrigerant by means of bypass line 78 into the stream of solution leaving absorber section 13 effectively dilutes the absorbent solution.

On shut down of the system, control relay 93 is deenergized and switch 97 opened rendering level switch 81 ineffective. Deenergization of relay 93 closes switch 96 enabling level responsive switch 82 to control operation of bypass valve solenoid 80 as will be more apparent hereinafter.

Level responsive switch 82 is below switch 81 and is arranged at a preset level representing desired solution concentration at system shut down. Since it is generally preferred that system solution concentration while the system is shut down be lower than that allowed during system operation, the response level of switch 82 is lower than the response level of switch 81.

Temperature responsive control 100 senses temperatures of the strong solution in line 40. When temperatures of the strong solution rise above a preset minimum, control switch 99 closes.

At shut down of the system, stop switch 92 is opened to deenergize control relay 93 which in turn opens relay switches 97, 98, while closing switch 96. At the same time, opening of switch 97 shuts down generator section 10. Where switch 99 is closed, the energizing circuits to contactor coils 94, 95 are maintained through switch 99 and safety switches 91, and both refrigerant and solution pumps 36, 66 continue to operate. The continued operation of pumps 36, 66 following shut down of generator section 10 circulates both refrigerant and absorbent through the system and reduces the solution concentration. A corresponding reduction in temperature of the solution flowing through line 40 takes place. When temperatures of the solution in line 40 fall below the preset response temperature of control 100, switch 99 is opened to interrupt the energizing circuit to contactor coils 94, 95 and deenergize both refrigerant and solution pumps 36, 66 respectively.

Where stop switch 92 is opened, the control relay 93 is deenergized and switch 96 thereof closes. If switch 99 of control 100 is closed, the refrigerant and solution pumps 36, 66 respectively remain operative under the control of switch 99 as explained heretofore. Where the refrigerant level in the evaporator sump 34 is above the preset response level of switch 82, switch 82 closes to complete, through switch 99, safety switches 91, switch 82, and control relay switch 96 an energizing circuit to solenoid 80 of bypass valve 79. Solenoid 80 opens valve 79 to divert a portion of the refrigerant leaving pump 36 through bypass line 78 into solution line 65.

While I have described a preferred embodiment of my invention it will be understood that the invention is not limited thereto, but may be otherwise embodied within the scope of the following claims.

I claim:

1. In an absorption refrigeration machine of the type having a generator section, a condenser section, an evaporator section, and an absorber section, the combination of: means forming a path for the flow of solution between said absorber and generator sections; said solution path forming means including first conduit means for conveying relatively weak solution from said absorber section to said generator section, solution pumping means, and second conduit means for returning concentrated solution from said generator section to said absorber section; refrigerant pumping means; control means adapted to render said solution and refrigerant pumping means inoperative on shut down of said machine; and means to control concentration of said solution, said solution concentration control means including means responsive to solution temperature conditions adapted at a predetermined solution temperature to override said first mentioned control means and maintain said solution and refrigerant pumping means operative following shut down of said machine.

2. An absorption refrigeration machine according to claim 1 in which said solution temperature responsive means includes a temperature sensitive element in heat exchange relation with said second conduit means.

3. An absorption refrigeration machine according to claim 1 in which said solution concentration control means includes a bypass conduit for diverting refrigerant from said refrigerant pumping means into said solution path forming means.

4. An absorption refrigeration machine according to claim 3 in which said evaporator section includes a sump within which liquid refrigerant is adapted to accumulate, said bypass conduit being between the outlet of said refrigerant pumping means and the inlet of said solution pumping means, a valve for said bypass conduit, and means for controlling said valve in response to the quantity of refrigerant in said sump.

5. An absorption refrigeration machine according to claim 4 in which said valve controlling means includes a first control element responsive to refrigerant levels in said evaporator sump effective at a first refrigerant level to actuate said valve and open said bypass conduit whereby refrigerant from said refrigerant pumping means diverted through said bypass conduit dilutes solution in said solution forming path means to reduce solution concentration.

6. An absorption refrigeration machine according to claim 5 in which said valve controlling means includes a second control element responsive to refrigerant levels in said evaporator section sump effective at a second refrigerant level to actuate said valve and open said bypass conduit whereby solution in said solution path forming means is diluted and solution concentration reduced, said second refrigerant level being below said first refrigerant level; and means to preclude operation of said first control element on shut down of said machine while readying said second control element for controlling operation.

7. An absorption refrigeration machine having a generator condenser, evaporator and absorber; means for passing weak solution from said absorber to said generator for reconcentration, a strong solution line for returning concentrated solution from the generator to the absorber; the evaporator including a sump within which liquid refrigerant is adapted to accumulate; a refrigerant pump for circulating refrigerant drawn from the evaporator sump to the evaporator; and a solenoid operated valve controlled bypass line between the downstream side of the refrigerant pump and the upstream side of the solution pump, the combination of: a first circuit for energizing said refrigerant pump; a second circuit for energizing said solenoid; and switch means effective at a first level of refrigerant in said evaporator sump to complete said second circuit to energize said solenoid thereby actuating said valve to open said bypass line and reduce solution concentration.

8. An absorption refrigeration system according to claim 7 including a control switch effective when actuated to complete said first circuit and energize said refrigerant pump; simultaneous actuation of both said control switch and said second circuit switch means completing said circuit to energize said bypass valve solenoid.

9. An absorption refrigeration system according to claim 8 including a third circuit for energizing said bypass valve solenoid, said third circuit including first switch means effective at a second refrigerant level in said evaporator sump to interrupt said third circuit; said second refrigerant sump level; and second switch means in said third circuit adapted to interrupt said third circuit in response to actuation of said control switch whereby said third circuit first switch means is rendered ineffective.

10. An absorption refrigeration system according to claim 9 including a solution pump, a fourth circuit for energizing said solution pump; a second control switch paralleling said first control switch, said second control switch being adapted at a predetermined temperature condition of the concentrated solution leaving said generator through said solution return line to complete said first and fourth circuits to energize said solution and refrigerant pumps following deactuation of said first control switch.

11. An absorption refrigeration system comprising:
(A) an evaporator including an evaporator heat exchanger for evaporating refrigerant to cool a fluid medium in heat exchange therewith, said evaporator having a refrigerant sump associated therewith for collecting liquid refrigerant;
(B) an absorber for absorbing refrigerant vapor formed in the evaporator into absorbent solution cooled in the absorber by heat exchange with a cooling medium;
(C) a generator for separating refrigerant from weak absorbent solution and concentrating the absorbent solution by passing it in heat exchange relation with a heating medium to vaporize refrigerant therefrom;

(D) a condenser for condensing refrigerant vapor formed in the generator by passing it in heat exchange relation with a cooling medium;

(E) weak solution passage means including a weak solution pump for passing weak absorbent solution from the absorber to the generator for concentration thereof;

(F) strong solution passage means for passing strong absorbent solution from the generator to the absorber for absorption of refrigerant vapor therein;

(G) a refrigerant recirculation passage including a refrigerant recirculation pump for withdrawing refrigerant from the refrigerant sump and discharging it over the evaporator heat exchanger;

(H) a refrigerant bypass passage extending from said refrigerant recirculation passage at a location downstream of said refrigerant recirculation pump to said weak solution passage at a location upstream of said weak solution pump, said refrigerant bypass passage including a refrigerant bypass valve for controlling the flow of liquid refrigerant from said refrigerant recirculation passage to said weak solution passage;

(I) refrigerant level responsive means for sensing the existence of a first level of refrigerant in said refrigerant sump; and (J) control circuit means for opening said refrigerant bypass valve upon sensing by said refrigerant level responsive means the occurrence of a refrigerant level in said refrigerant sump in excess of said first level thereof, thereby diluting absorbent solution with refrigerant to prevent overconcentration of the absorbent solution.

12. An absorption refrigeration system as defined in claim 11 including:

(A) switch means for initiating termination of operation of said refrigeration system including said pumps;

(B) refrigerant level responsive means for sensing the presence of a second refrigerant level in said refrigerant sump, said second level being lower than said first level thereof;

(C) circuit means for opening said refrigerant bypass valve upon initiating termination of operation of said system to dilute the absorbent solution in said system upon shutdown of the system;

(D) control circuit means for continuing energization of said refrigerant recirculation pump and said weak solution pump after initiating termination of operation of said system to provide dilution of absorbent solution in said system; and (E) control circuit means to close said refrigerant bypass valve and terminate dilution of absorbent solution with refrigerant from said refrigerant sump upon sensing of a level of refrigerant in said refrigerant sump at said second level, to prevent excessive dilution of the absorbent solution upon termination of operation of the system.

13. An absorption refrigeration system as defined in claim 12 including:

(A) temperature responsive means for sensing a temperature of strong solution in said system; and (B) circuit means to continue operation of said refrigerant recirculation pump and said weak solution pump until the sensed temperature of strong solution in said system is below a predetermined temperature.

14. An absorption refrigeration system as defined in claim 11 including:

(A) switch means for initiating termination of operation of said refrigeration system including said pumps;

(B) circuit means for opening said refrigerant bypass valve upon initiating termination of operation of said system to dilute the absorbent solution in said system upon shutdown of the system;

(C) control circuit means for continuing energization of said refrigerant recirculation pump and said weak solution pump after initiating termination of operation of said system to provide dilution of absorbent solution in said system; and (D) control circuit means to close said refrigerant bypass valve and terminate dilution of absorbent solution with refrigerant from said refrigerant sump upon sensing of a level of refrigerant in said refrigerant sump at said level, to prevent excessive dilution of the absorbent solution upon termination of operation of the system.

References Cited

UNITED STATES PATENTS

| | | | |
|---|---|---|---|
| 3,005,318 | 10/1961 | Miner | 62—141 |
| 3,122,002 | 2/1964 | Miner et al. | 62—141 |

LLOYD L. KING, *Primary Examiner.*